United States Patent
Al-Khairy

(10) Patent No.: US 8,808,142 B2
(45) Date of Patent: Aug. 19, 2014

(54) AIRCRAFT APU ELECTRICAL STARTER TORQUE LIMITER

(75) Inventor: Issam Al-Khairy, Verdun (CA)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 316 days.

(21) Appl. No.: 13/442,164

(22) Filed: Apr. 9, 2012

(65) Prior Publication Data

US 2013/0267379 A1    Oct. 10, 2013

(51) Int. Cl.
*B60K 23/00* (2006.01)
*F02N 11/08* (2006.01)

(52) U.S. Cl.
USPC ............................ 477/167; 477/8

(58) Field of Classification Search
USPC ........ 477/7, 8, 70, 83, 84, 166, 167, 174–176
See application file for complete search history.

(56) References Cited

U.S. PATENT DOCUMENTS

| | | | |
|---|---|---|---|
| 4,609,155 A | 9/1986 | Garnier | |
| 4,901,690 A | 2/1990 | Cummins et al. | |
| 5,428,275 A | 6/1995 | Carr et al. | |
| 5,899,411 A | 5/1999 | Latos et al. | |
| 6,035,626 A | 3/2000 | Wahl et al. | |
| 6,256,977 B1 | 7/2001 | McGinley et al. | |
| 6,278,262 B1 | 8/2001 | Ullyott | |
| 6,777,822 B1 | 8/2004 | Suttie et al. | |
| 6,836,086 B1 | 12/2004 | Goldberg et al. | |
| 7,253,535 B2 | 8/2007 | Duesterhoeft | |
| 7,448,220 B2 | 11/2008 | Schmidt et al. | |
| 7,638,890 B2 | 12/2009 | Lando et al. | |
| 7,805,947 B2 | 10/2010 | Moulebhar | |
| 7,840,333 B2 | 11/2010 | Mehrer et al. | |
| 2010/0264670 A1 | 10/2010 | Usami et al. | |
| 2011/0118078 A1* | 5/2011 | Kraska et al. | 477/5 |
| 2011/0304157 A1 | 12/2011 | Poisson | |
| 2011/0304158 A1 | 12/2011 | Poisson | |

FOREIGN PATENT DOCUMENTS

EP    1580063    9/2005
WO   WO0118390   3/2001

OTHER PUBLICATIONS

International Publication No. PCT/US2013/035697 International Search Report and Written Opinion dated Jul. 26, 2013, 10 pages.

* cited by examiner

*Primary Examiner* — Justin Holmes
(74) *Attorney, Agent, or Firm* — Cantor Colburn LLP

(57) ABSTRACT

A starter system for an auxiliary power unit (APU) includes a starter motor operably connectable to the APU. A clutch is arranged to operably connect the starter motor to the APU when engaged. A torque limiting control unit is disposed and configured to provide APU starter power to the starter motor according to a starting schedule. The starting schedule is configured to govern an acceleration rate of the starter motor after the clutch is engaged.

20 Claims, 2 Drawing Sheets

AIRCRAFT APU ELECTRICAL STARTER TORQUE LIMITER

BACKGROUND OF THE INVENTION

The subject matter disclosed herein relates to auxiliary power units (APUs) for aircraft. More specifically, the subject disclosure relates to an electrical starter torque limiter for an APU.

Aircraft engines have large heavy rotors that must be accelerated to a high rotational speed in order to provide sufficient air compression for self-sustaining operation. An APU provides the power required to get the rotors turning at the required speed. First, however, the APU is started by an APU starter, which is a direct-current (DC) electric motor with power supplied by a battery, accumulator, or external power source, such as a ground power unit. Once the APU accelerates to full speed, it can provide enough power to start the aircraft's main engines, either by turning an electrical generator or a hydraulic pump, or by providing compressed air to an air turbine of the starter motor.

When starting the APU, power is supplied to the DC motor and a clutch which engages the APU to begin its operation. Typically, power is supplied to the DC motor and the clutch from the same electrical line, so that when the DC motor is activated, the clutch is simultaneously activated. The result is that the DC motor accelerates to speed before the clutch is completely engaged, and causes a high torque shock on a starter shaft when the clutch engages the shaft. The torque shock can cause damage and/or breakage of the shaft. The torque shock can also result in damage to an APU gearbox that is driven by the starter shaft. Rapid acceleration of the DC motor after the clutch is engaged may lead to an over-torque condition at the APU gearbox, potentially resulting in damage to the APU gearbox.

BRIEF DESCRIPTION OF THE INVENTION

According to one aspect of the invention, a starter system for an auxiliary power unit (APU) includes a starter motor operably connectable to the APU. A clutch is arranged to operably connect the starter motor to the APU when engaged. A torque limiting control unit is disposed and configured to provide APU starter power to the starter motor according to a starting schedule. The starting schedule is configured to govern an acceleration rate of the starter motor after the clutch is engaged.

According to another aspect of the invention, a method of starting an APU includes outputting a clutch command from a torque limiting control unit to engage a clutch of a starter system. APU starter power is output from the torque limiting control unit to a starter motor of the starter system according to a starting schedule. The starting schedule is configured to govern an acceleration rate of the starter motor after the clutch is engaged.

According to another aspect of the invention, a torque limiting control unit for a starter system of an APU includes a starting schedule configured to govern an acceleration rate of a starter motor. A clutch driver is configured to provide a clutch command to a clutch. A control module is configured to provide APU starter power to the starter motor according to the starting schedule after the clutch is engaged.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
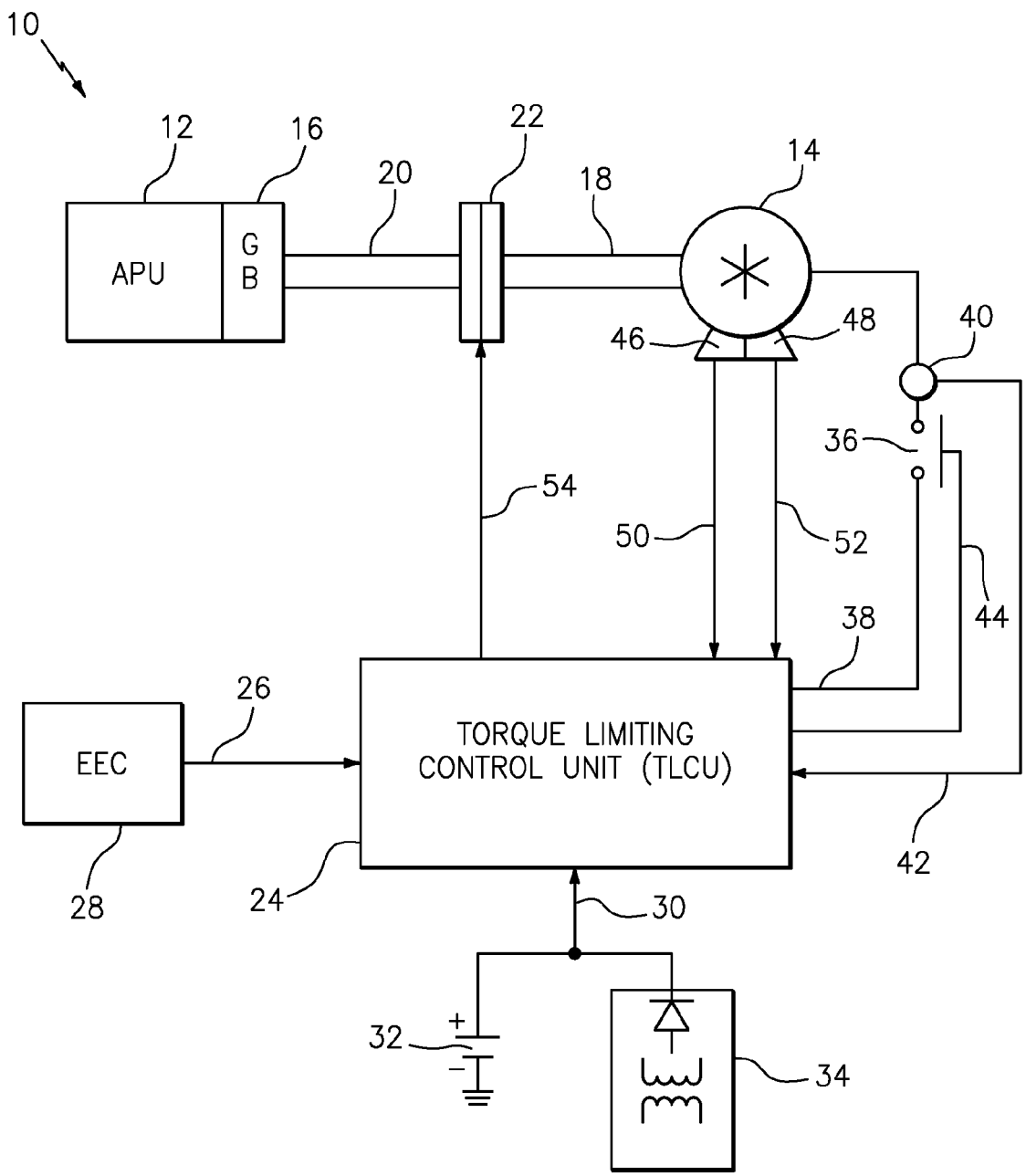
FIG. 1 is a schematic view of an embodiment of a starter system for an auxiliary power unit.

Shown in FIG. 1 is a schematic of a starter system 10 for an auxiliary power unit (APU) 12. The starter system 10 includes a starter motor 14, for example, a direct-current (DC) electric motor, and a motor shaft 18 extending therefrom. A starter shaft 20 extends from a gearbox 16 of the APU 12 and is connectable to the motor shaft 18 via a clutch 22. When the clutch 22 is engaged, rotational energy is transferred from the starter motor 14, through the motor shaft 18 and starter shaft 20, to the gearbox 16 of the APU 12. The starter system 10 also includes a torque limiting control unit (TLCU) 24 configured to receive engine electronic control (EEC) communication 26 from an EEC 28. The EEC 28 may be a main engine EEC or an APU EEC. While the TLCU 24 and EEC 28 are separately depicted in FIG. 1, it will be understood that the TLCU 24 and EEC 28 can be combined.

The TLCU 24 receives input power 30, which can be provided by a battery 32, a transformer rectifier unit (TRU) 34, or a combination thereof. The TRU 34 provides DC power derived from a source of alternating-current (AC) power, such as an AC generator. Regardless of the source of the input power 30, the TLCU 24 conditions the input power 30 to drive the starter motor 14.

In the illustrated embodiment, a switch 36 is arranged in series between the TLCU 24 and the starter motor 14. The switch 36 is controlled by the TLCU 24 to control the flow of APU starter power 38 from the TLCU 24 to the starter motor 14. When the switch 36 is closed, the APU starter power 38 from the TLCU 24 controls motor speed of the starter motor 14. The switch 36 can be an electrical relay or contactor. Alternatively, the switch 36 may be a solid-state device, such as a metal-oxide-semiconductor field-effect transistor (MOSFET), or other switching device known in the art.

A feedback sensor 40 provides a switch feedback 42 to the TLCU 24, which may be, for example, a voltage level between the switch 36 and the starter motor 14. The TLCU 24 drives a switch command 44 to control the switch 36. The TLCU 24 also receives feedback from a starter current sensor 46 and a starter speed sensor 48 at the starter motor 14. The starter current sensor 46 provides a starter feedback current 50 to the TLCU 24. The starter speed sensor 48 provides a starter feedback speed 52 to the TLCU 24. The TLCU 24 outputs a clutch command 54 to power the clutch 22 and control clutch engagement.

Figure 2:
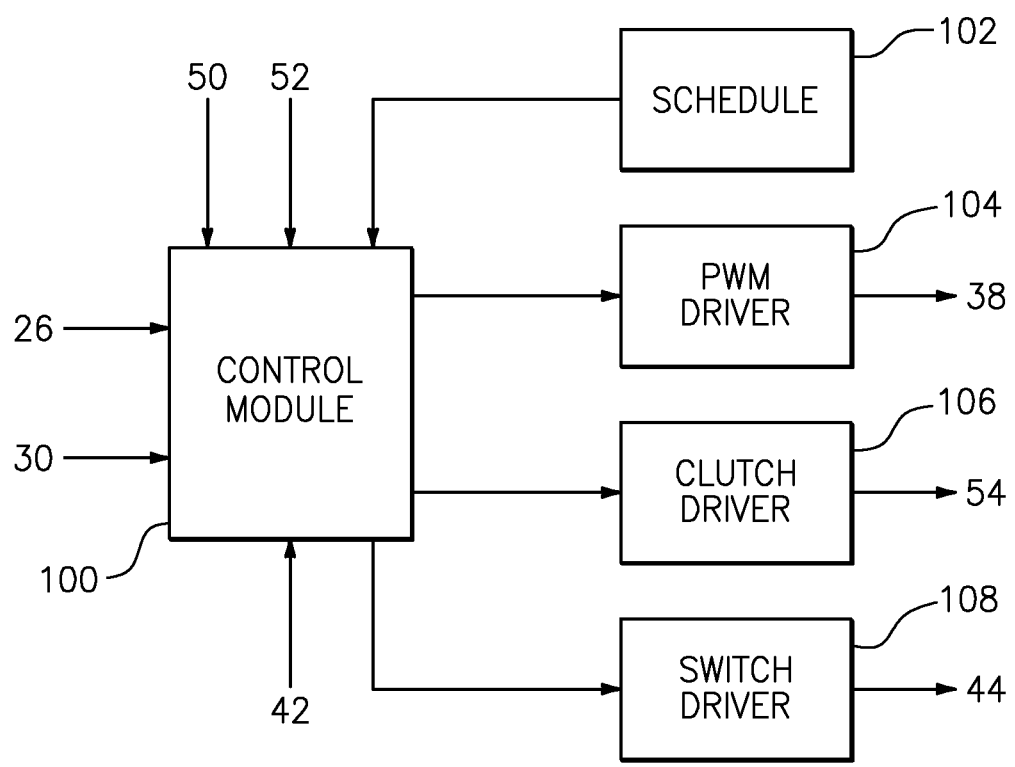
FIG. 2 is a schematic view of a torque limiting control unit in accordance with an embodiment.

Referring now to FIG. 2 and with continued reference to FIG. 1, a schematic view of the TLCU 24 of FIG. 1 is depicted in accordance with an embodiment. The TLCU 24 includes a control module 100 configured to receive the EEC communication 26, the input power 30, the switch feedback 42, the starter feedback current 50, and the starter feedback speed 52. The control module 100 is further operable to read a starting schedule 102 and generate outputs to a pulse-width modulation (PWM) driver 104, a clutch driver 106, and a switch driver 108. The control module 100 may be embodied in one or more of a processor, logic device, or application specific integrated circuit, and can further include memory and support circuitry. While the control module 100, starting schedule 102, PWM driver 104, clutch driver 106, and switch driver 108 are depicted as separate elements, it will be understood that they can be integrated into any number of combinations or sub-combinations.

The starting schedule 102 may be formatted as a table to map torque limits versus time. Values in the starting schedule 102 may be pulse widths, duty cycles, or other values related to torque and acceleration that are convertible to pulse timing. The control module 100 is configured to adjust the starting schedule 102 based on the starter feedback current 50 and/or the starter feedback speed 52. The contents of the starting schedule 102 are configurable based on the overall configuration of the starter system 10 with respect to electrical and mechanical characteristics. The control module 100 can use feedback from the starter feedback current 50 and the starter feedback speed 52 to determine torque at the motor shaft 18 as driven by the starter motor 14. The starter feedback current 50 can be used to calculate back-electromotive force. The starter feedback speed 52 may be used for speed monitoring or further processed for acceleration monitoring. In an embodiment, torque of the starter motor 14 is proportional to the product of armature current and field flux strength of the starter motor 14. The relationship between speed and torque depends on excitation of the starter motor 14 as provided by the APU starter power 38.

The PWM driver 104 outputs the APU starter power 38. The control module 100 may command and change a duty cycle of the PWM driver 104 to set and change an average current and average voltage of the APU starter power 38. The PWM driver 104 can include one or more solid-state switches (not depicted) to modulate the APU starter power 38 as a function of the input power 30. For example, if the input power 30 is not otherwise limited, a 50% duty cycle at the PWM driver 104 results in setting the APU starter power 38 to about half of the input power 30. An increase in the average current or voltage of the APU starter power 38 increases the speed of starter motor 14. The control module 100 adjusts the PWM driver 104 based on the starting schedule 102 to govern an acceleration rate of the starter motor 14 after the clutch 22 is engaged. The acceleration rate of the starter motor 14 can be derived from the starter feedback speed 52. Acceleration rate control relative to the starter feedback current 50 controls the rise in torque at the starter motor 14, and thus through the starter shaft 18, clutch 22, APU shaft 20, and gearbox 16.

The control module 100 is further configured to adjust the APU starter power 38 based on the input power 30 received at the torque limiting control unit 24. In some cases, the current available at the input power 30 exceeds a desired current, since the input power 30 may be a sum of power from the battery 32 and the TRU 34. A gain adjustment can be made or a limiting function applied to maintain the rate of change and value of the APU starter power 38. For example, if the starting schedule 102 is calibrated for a particular nominal voltage, the control module 100 may adjust the starting schedule 102 relative to a difference between the calibrated nominal voltage and the actual voltage of the input power 30. Alternatively, if the input power 30 is provided directly to the PWM driver 104, duty cycle values calculated based on the starting schedule 102 to command the PWM driver 104 can be rescaled based on the difference between the calibrated nominal voltage and the actual voltage of the input power 30. As a further alternative, the input power 30 can be clamped such that it cannot exceed a threshold value.

The clutch driver 106 outputs the clutch command 54 in response to the control module 100. Independent control of the PWM driver 104 and clutch driver 106 enables timing differences and voltage/current level differences between the APU starter power 38 and the clutch command 54. The switch driver 108 outputs the switch command 44 in response to the control module 100.

When an APU start command is received on EEC communication 26, the TLCU 24 powers the clutch 22 via clutch command 54 and closes switch 36 in response to the switch command 44. The TLCU 24 monitors an output of the switch 36 using the feedback sensor 40 to verify that the switch 36 closed based on the switch feedback 42. An initial low-level signal may be output as the APU starter power 38 of a level sufficient to be detected by the feedback sensor 40. Upon verifying that the switch 36 closed (i.e., turned on), the TLCU 24 powers the starter motor 14 through APU starter power 38 according to the starting schedule 102. To limit torque at the starter motor 14, the starting schedule 102 and the APU starter power 38 may be monitored and adjusted as previously described.

Technical effects include torque limiting in a starter system of an APU. By controlling torque during an APU start sequence according to a starting schedule, over-torque protection is provided for components susceptible to high torque induced damage, such as a motor shaft, a starter shaft, a clutch, a gearbox, and associated components. Torque limiting may be adjusted according to feedback from various system outputs in addition to applying input power limits.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A starter system for an auxiliary power unit (APU) comprising:
   a starter motor operably connectable to the APU;
   a clutch arranged to operably connect the starter motor to the APU when engaged; and
   a torque limiting control unit disposed and configured to provide APU starter power to the starter motor according to a starting schedule, the starting schedule configured to govern an acceleration rate of the starter motor after the clutch is engaged.

2. The starter system of claim 1, further comprising a switch in series between the torque limiting control unit and the starter motor, the switch configurable to provide the APU starter power from the torque limiting control unit to the starter motor.

3. The starter system of claim 2, further comprising a feedback sensor arranged between the switch and the starter motor.

4. The starter system of claim 3, wherein the torque limiting control unit is configured to provide a clutch command to engage the clutch, a switch command to close the switch, and to verify that the switch closed based on switch feedback from the feedback sensor prior to providing the APU starter power to the starter motor according to the starting schedule.

5. The starter system of claim 1, wherein the clutch operably engages the starter motor with a starter shaft of the auxiliary power unit, the starter shaft operable to drive a gearbox of the APU.

6. The starter system of claim 1, further comprising:
a starter current sensor to provide a starter feedback current to the torque limiting control unit; and
a starter speed sensor to provide a starter feedback speed to the torque limiting control unit.

7. The starter system of claim 6, wherein the starting schedule comprises a table to map torque limits versus time, and the torque limiting control unit is configured to adjust the starting schedule based on one or more of the starter feedback current and the starter feedback speed.

8. The starter system of claim 1, wherein the torque limiting control unit is configured to provide the APU starter power based on a start command received as engine electronic control (EEC) communication from an EEC.

9. The starter system of claim 1, wherein the APU starter power is further adjusted based on input power received at the torque limiting control unit.

10. The starter system of claim 9, wherein the input power is received from one or more of a battery and a transformer rectifier unit.

11. A method of starting an auxiliary power unit (APU) comprising:
outputting a clutch command from a torque limiting control unit to engage a clutch of a starter system; and
outputting APU starter power from the torque limiting control unit to a starter motor of the starter system according to a starting schedule, the starting schedule configured to govern an acceleration rate of the starter motor after the clutch is engaged.

12. The method of claim 11, further comprising closing a switch in series between the torque limiting control unit and the starter motor to provide the APU starter power from the torque limiting control unit to the starter motor.

13. The method of claim 12, further comprising verifying that the switch closed based on switch feedback from a feedback sensor prior to providing the APU starter power to the starter motor according to the starting schedule.

14. The method of claim 11, further comprising:
receiving a starter feedback current from a starter current sensor at the torque limiting control unit;
receiving a starter feedback speed from a starter speed sensor at the torque limiting control unit; and
adjusting the starting schedule based on one or more of the starter feedback current and the starter feedback speed.

15. The method of claim 11, further comprising providing the APU starter power based on a start command received as engine electronic control (EEC) communication from an EEC.

16. The method of claim 11 further comprising adjusting the APU starter power based on input power received at the torque limiting control unit, wherein the input power is received from one or more of a battery and a transformer rectifier unit.

17. A torque limiting control unit for a starter system of an auxiliary power unit (APU) comprising:
a starting schedule configured to govern an acceleration rate of a starter motor;
a clutch driver configured to provide a clutch command to a clutch; and
a control module configured to provide APU starter power to the starter motor according to the starting schedule after the clutch is engaged.

18. The torque limiting control unit of claim 17 further comprising a pulse width modulation driver, the pulse width modulation driver configured to provide the APU starter power as a pulse width modulated output.

19. The torque liming unit of claim 17 further comprising a switch driver, the switch driver configured to provide the APU starter power from the torque limiting control unit to the starter motor based on a switch command from the control module.

20. The torque limiting control unit of claim 17, wherein the control module is configured to adjust the starting schedule based on one or more of a starter feedback current and a starter feedback speed, and to adjust the APU starter power based on input power received at the torque limiting control unit.

* * * * *